March 1, 1932. J. R. OISHEI 1,848,064
TRUCK MIRROR
Filed July 11, 1927
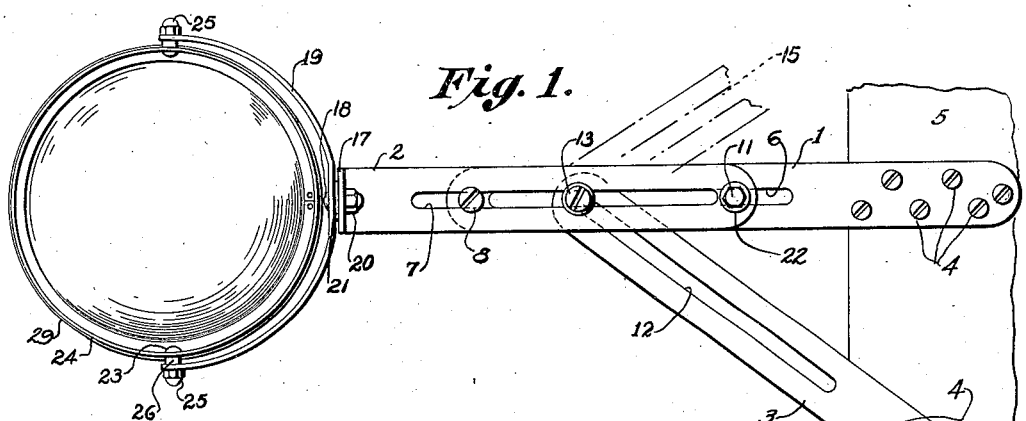
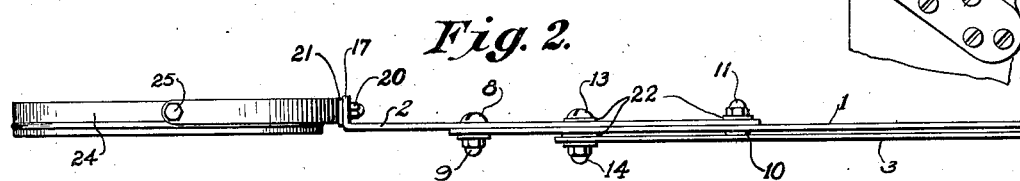
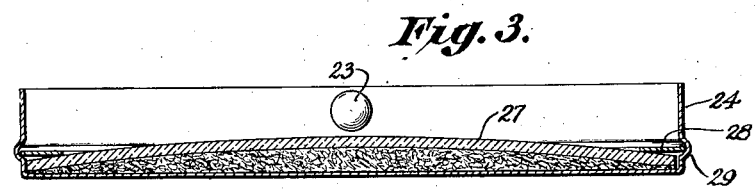
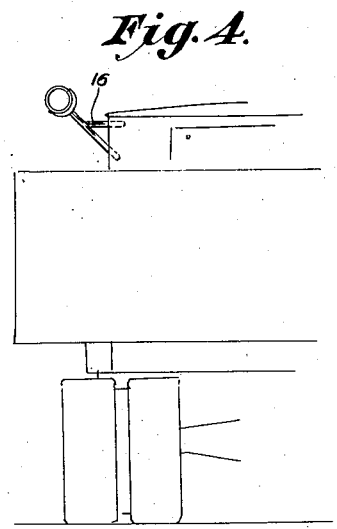
Inventor
John R. Oishei
Atty. Barton A. Bean Jr.

Patented Mar. 1, 1932

1,848,064

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

TRUCK MIRROR

Application filed July 11, 1927. Serial No. 204,761.

This invention relates to a rear view mirror and is especially designed for use on motor vehicles which are subject to excessive vibration and jarring such as heavy trucks equipped with solid rubber tires, although it is not limited in its uses to such vehicles.

Heretofore considerable attention has been given the mounting of rear view mirrors on passenger motor vehicles and practically no attention has been given in the inventive line toward the production of a rear view mirror for heavy trucks which will be practical and stand up under the rough usage to which the modern truck is subjected. The truck operator has therefore been forced to employ different makeshift and improvised mirror constructions which are not wholly adaptable for truck equipage. The ever increasing demands placed upon the modern and heavy motor trucks in the varied and numerous uses to which they are put necessitates a sturdy and substantial mounting for rear view mirrors which will withstand the excessive jarring and rough traveling of these motor vehicles.

It is therefore the object of the present invention to provide a rear view mirror with an improved mounting which is firm and rugged, and readily adaptable to the various manufacturers of motor trucks. It is a further object to provide a universally mounted truck mirror with an incorporated extensible adjustment whereby the reflector may be properly postioned for obtaining the best view of the traffic conditions to the rear. It is also an object of this invention to provide an improved and reversible supporting structure for the reflector, as well as to provide an improved reflector in which the reflective surface is protected against breakage and from the weather elements.

In the drawings,

Fig. 1 is an elevation of the improved truck mirror mounted upon a motor vehicle, the immediate supporting portion of the latter being alone shown;

Fig. 2 is a top plan view of the improved truck mirror;

Fig. 3 is a horizontal section through the reflector per se as shown in Fig. 1; and Fig. 4 is a schematic showing illustrating the mirror in a different mounting on a motor truck.

In proceeding in accordance with the present invention there is provided a bracket structure embodying a fixed arm section 1, an extensible holder arm section 2 and a strut or brace 3, the arm section 1 and the strut 3 being provided at their inner ends with a suitable number of apertures through which the attaching or anchoring screws 4 may pass in securing the rear view mirror to the windshield frame 5 of a motor vehicle. As a rule these windshield frames are of wooden construction but where they are of a metallic fabrication the screws 4 may be replaced by bolts or the respective ends of the bracket members may be conveniently shaped to effect a firm securement to the frame in furthering the spirit of the present invention.

The bracket arm 1 and its extensible holder section 2 are preferably formed from strap stock and provided with longitudinal slots 6 and 7 which are designed to register more or less throughout their entire length. The outer end of the arm 1, beyond its slot 6, is provided with an aperture 8' and in this aperture is mounted a clamping bolt 8 which passes through the slot 7 so that when its nut 9 is tightened the head of the bolt will be drawn against the outer face of the section 2 to securely clamp the two sections together. In the inner end of the holder section 2, and beyond its slot 7, is an aperture 11' to receive a clamping bolt 10 which passes through the slot 6 of the section 1 so that when its nut 11 is screwed on it will likewise effect a clamping together of the two sections. By disposing the nuts 8 and 10 in their individual apertures they are held properly spaced apart and are moved along their respective slots in a definite manner. The strut or brace 3 is likewise provided with a longitudinal slot 12 through which passes a clamping bolt 13 which latter also passes through the slots 6 and 7 at a point between the bolts 8 and 10 so that when its nut 14 is screwed home it will not only secure the brace or strut in a definite relation to the bracket arm formation but will also secure or assist in securing the holder section 2 at a predetermined extended relation with the fixed arm section 1. Thus, the extensible section 2 is clampingly secured to the fixed section 1 at three points and will be firmly secured by any and all of the clamping devices 8, 10 and 13. The strut or brace is reversible in that it may be swung to either side of the bracket arm formation such as is indicated by the dotted showing 15 in Fig. 1 or by the schematic showing at 16 in Fig. 4, the bracket arm construction being disposed at an acute angle to the adjacent side of the windshield frame in this latter disclosure. By this construction and arrangement the strut is brought into direct supporting and bracing relation to each section of the bracket arm.

The outer or free end of the holder section 2 is bent at an angle, preferably at a right angle, as indicated at 17, so as to form a flange or toe which is apertured to receive a pivot bolt 18. This pivot bolt is passed through a corresponding aperture in a yoke or bail member 19 for adjustably securing the latter to the flange or toe 17, a clamping nut 20 being applied to the bolt for securing the yoke in a desired and predetermined adjustment. A spacing washer 21 is preferably interposed between the toe 17 and the yoke 19, and other washers may be applied at suitable points, as indicated at 22, where desired. The free ends of the yoke member 19 are provided with oppositely disposed and inward extending trunnions for pivotally mounting the mirror or reflector about a vertical axis or an axis substantially at right angles to the pivoted axis 18. These trunnions in the present instance comprise bolts 23 which pass from within the mirror frame 24 radially outwardly through apertures therein and through apertures in the free ends of the yoke, clamping nuts 25 being applied to their outwardly protruding threaded ends. In order to properly space the mirror frame from the yoke, spacing washers 26 are interposed therebetween. Upon screwing home the nuts 25, the heads 23 of the bolts are drawn firmly against the inner periphery of the mirror frame to securely hold the reflector at a desired adjustment about the common axis of the pivot bolts 23.

The mirror or reflector here depicted comprises a deep cup which forms the frame 24. On the bottom of the cup is seated the reflector glass 27 which may be of a desired style but preferably of a concavo-convex and long-range-reducing style. The reflector glass or body is retained within the cup frame by a broad, thin insert frame or ring 28 which expands outwardly into an angular groove 29 formed in the surrounding wall of the cup frame. The broad insert frame affords protection to the reflector surface and tends to shed water. Furthermore, by reason of the deep cup frame 24 the glass reflector is further protected against breakage since the frame extends well above the glass. The bolts 23, by extending inwardly from the surrounding wall of the cup frame, serve to lock or hold the securing ring 28 and the reflector within the cup and against accidental displacement.

I claim as my invention.

1. A rear view mirror comprising a bracket, a yoke member pivoted thereto, a reflector having a cupped frame extending forwardly therefrom, and pivot bolts passing radially outward through apertures in the side wall of the forward extension of the cupped frame for pivotally securing the reflector to the yoke.

2. A motor vehicle mirror comprising a cupped frame, a reflector body seated in the cup, the surrounding wall of the cupped frame extending beyond the reflector body and having an aperture therein outwardly beyond and adjacent the reflector body, and a bracket support for the frame pivotally engaged in the aperture thereof.

3. A truck mirror comprising a bracket arm having a slidably extensible holder section the outer end of which is angularly bent, a yoke pivoted to said bent end on an axis lengthwise of said arm, opposed trunnions on the yoke, and a reflector supported on said trunnions for pivoting about an axis at an angle to said arm, and strut means adapted to be swung and fastened to either side of said arm and acting to adjustably secure the holder section to the arm.

4. A rear view mirror for motor vehicles comprising a supporting bracket, a yoke member pivotally connected thereto, a mirror frame pivotally connected to the yoke member and formed with a continuous protecting rim having an annular groove therein, a convex reflector mounted in the mirror frame upon a resilient backing, and a split broad thin locking ring adapted to be sprung into the annular groove whereby the ring is resiliently seated on the convex reflector due to a camming action between the ring and groove.

5. A motor vehicle mirror comprising a mirror frame formed with a continuous outwardly projecting rim having an annular groove formed therein, a convex reflector mounted in the mirror frame upon a resilient backing, a split locking ring engaged in the annular groove under compression whereby the reflector is resiliently held in position, and a pair of opposed pivotal connections which pass through the rim intermediate the outer edge thereof and the annular groove, the heads of said pivotal connections lying inwardly of the peripheries of the locking ring and reflector to prevent loss of the ring and reflector.

6. In a rear vision mirror for motor vehicles, a fixed arm having an aperture adjacent its outer end and a slot intermediate the aperture and the opposite end, an extensible arm having an aperture and a slot overlying the apertures and slot in the fixed arm but in reverse order with the aperture of each arm registering with the slot in the other arm, a clamping device mounted in each aperture and extending through the slot in the other arm for securing the arm in rigid adjusted relation, a longitudinally slotted brace for supporting the fixed arm and extensible arm at a location intermediate said clamping devices, a clamping device extending through the registering portions of the slots in both arms and through the slotted portion of the brace for maintaining the supporting relation of the brace and arm, and a reflector adjustably connected to an angular portion formed on the end of the extensible arm, said brace being movable to extend transversely of the arm from either side thereof without interfering with any of the clamping elements.

JOHN R. OISHEI.